United States Patent [19]
Pinceloup

[11] Patent Number: 5,767,492
[45] Date of Patent: Jun. 16, 1998

[54] TUNNEL OVEN FOR COOKING FOOD, INCLUDING A DEVICE FOR CONNECTING TWO TUNNEL OVEN SEGMENTS

[75] Inventor: Didier Pinceloup, Villefranche sur Saone, France

[73] Assignee: Cidelcem Industries, Lognes, France

[21] Appl. No.: 625,344

[22] Filed: Apr. 1, 1996

[30] Foreign Application Priority Data

Mar. 31, 1995 [FR] France ................... 95 03797

[51] Int. Cl.[6] .................................................. H05B 6/76
[52] U.S. Cl. ................... 219/699; 219/698; 219/701; 219/738; 219/744; 219/388; 126/275 E
[58] Field of Search .............................. 219/698, 699, 219/700, 701, 739, 756, 388, 744; 125/275 E, 19 R, 19 M

[56] References Cited

U.S. PATENT DOCUMENTS

| | | | |
|---|---|---|---|
| 3,699,899 | 10/1972 | Schiffmann et al. | 219/701 |
| 4,227,063 | 10/1980 | Edgar et al. | 219/699 |
| 4,245,613 | 1/1981 | Wells et al. | |
| 4,246,462 | 1/1981 | Meisel | 219/701 |
| 4,764,108 | 8/1988 | Carthew et al. | |
| 5,026,957 | 6/1991 | Pralus | 219/756 |

FOREIGN PATENT DOCUMENTS

WO 95/00021  1/1995  WIPO.

*Primary Examiner*—Philip H. Leung
*Attorney, Agent, or Firm*—Young & Thompson

[57] ABSTRACT

A connection device for two successive segments (1A, 1B) of a tunnel oven for cooking food, comprises a first sleeve (16A) fixed to the frame (18) of the tunnel and second sleeve (17) secured to the tunnel segments (1A, 1B). The second sleeve (17) is mounted axially slidable relative to the first sleeve (16A). Seals (25) are disposed between the first and second sleeves, within the thickness of these latter, so as to permit sliding without loss of sealing. The device also comprises, in series, a quarter wave trap (26) and a body (31) that absorbs microwaves, also disposed within the thickness of the device.

10 Claims, 4 Drawing Sheets

TUNNEL OVEN FOR COOKING FOOD, INCLUDING A DEVICE FOR CONNECTING TWO TUNNEL OVEN SEGMENTS

FIELD OF THE INVENTION

The present invention relates to ovens for cooking food for professional use, in particular to tunnel ovens for cooking. It relates, more particularly, to a device for connecting two successive segments of such ovens.

Cooking tunnels are known which comprise a generally elongated enclosure divided into a succession of cooking sections. This enclosure is at one of its ends connected to an inlet closure and at the other end to an outlet closure.

Cooking tunnels are preferably provided for a simultaneous cooking, combined or separated as a function of the foodstuffs to be cooked, by means of microwaves, hot air, steam or infrared radiation.

Each section in a series of sections comprises an oven, and is in the case of the use of microwaves, separated from the following section by a deflector suspended from a wall forming a ceiling of the enclosure. Each section thus comprises a chamber which can preferably be associated with several microwave applicators opening within the interior of the chamber.

Each heating mode is controlled separately so as to be able to be combined as desired with other heating modes as a function of the foods to be prepared.

These cooking tunnels operate continuously and their capacity is for example about 2500 portions in seven hours of operation at 250° C., the foodstuffs being contained during cooking in trays disposed on carriages which move through the tunnel with the aid of a conveyor.

In cooking tunnels, the increase of the production per unit time requires necessarily an increase in the length of the tunnels which, by way of example, can be six meters long or even more.

The tunnels are assembled from segments aligned and connected to each other by welding. Each segment can comprise one or several cooking sections or cooking chambers.

The exceptional length of the tunnels gives rise in this regard to a problem because all the cooking modes contribute to raising the temperature of the walls of the enclosure, which gives rise to expansion of these latter.

This expansion, which is of the order of 1 mm/m/100° C., gives rise to a deformation which can lead to rupture of the welds or of the metal sheets which comprise the enclosure.

For tunnels using microwave energy and which are also the subject of the invention, the design must moreover integrate the concept of sealing in the electromagnetic radiation.

In cooking tunnels using microwave heating, it is indispensable to have within the enclosure walls of a reflective material such as steel, but also assemblies which ensure the electromagnetic continuity between the different conductive portions exposed to radiation.

So as to decrease the risk of rupture in the connections between segments, it is known to provide a connecting device consisting in the interposition, between the constituent segments of a tunnel oven, of a metallic bellows having the function of ensuring the continuity of the tunnels whilst permitting a measure of deformation either in expansion or in contraction.

However, these bellows have drawbacks consisting essentially in deterioration which inevitably arises because of the alternating operations imposed thereon. Fatigue ruptures of the folds of the bellows arise, which reduces not only the economy of operation of the tunnel, but also the safety of the apparatus in the case of the use of a heating mode comprising microwaves.

OBJECTS OF THE INVENTION

The invention has for its object to overcome these drawbacks by providing a simple and reliable connecting device which resists without difficulty the effects of the contractions and elongations of the constituent segments of the enclosure and which accordingly guarantees the sealing of the connections between segments.

The invention has for its object a connecting device for two successive segments of a tunnel oven for cooking food, characterized in that it comprises a first sleeve fixed to the frame of the tunnel and at least a second sleeve fixed to one of the segments of the tunnel, the second sleeve being mounted axially slidingly relative to the first sleeve, and sealing means disposed between the first and second sleeves, within the thickness of these latter, so as to permit sliding without loss of the seal.

According to other characteristics of the invention:

- the two successive segments are fixed to a second respective sleeve, the two second sleeves being symmetrically disposed on opposite sides of the first sleeve;
- the sealing means comprise an elastic sealing joint disposed in an inwardly opening recess of the tunnel and delimited by shoulders facing the first and second sleeves, as well as by a sleeve portion forming a bottom of this recess;
- the shoulders are followed by respective sleeve portions extending parallel to each other in the axial direction of the first and second sleeves, these sleeve portions being mounted slidingly one on the other so as to constitute guide means for the second sleeve during axial sliding relative to the first sleeve;
- the device is particularly adapted to tunnel ovens utilizing microwave energy and it comprises moreover a quarter wave trap disposed within the thickness of the first sleeve, adjacent the sealing means;
- the device moreover comprises a body that absorbs microwaves, also disposed in the thickness of the first sleeve, following the quarter wave trap, this absorbent body filling all the space across the thickness between the first and second sleeves;
- it comprises guide means for the second sleeve for axial sliding relative to the first sleeve, comprising plates regularly disposed about the periphery of the connection device and interposed between the frame of the tunnel oven and a sleeve portion of the second sleeve;
- it comprises supplemental guide means in the form of L-shaped members fixed to the second sleeve and bearing against the external surfaces of the plates;
- it has a rectangular shape and it is disposed in the lower portion of the tunnel;
- the sealing means, the quarter wave trap and the absorbent body for microwaves are of silicone.

BRIEF DESCRIPTION OF THE DRAWINGS

The invention will now be described by way of example with reference to the accompanying drawings, in which.

The same elements in different figures bear the same reference numerals.

DETAILED DESCRIPTION OF THE INVENTION

Figure 1:
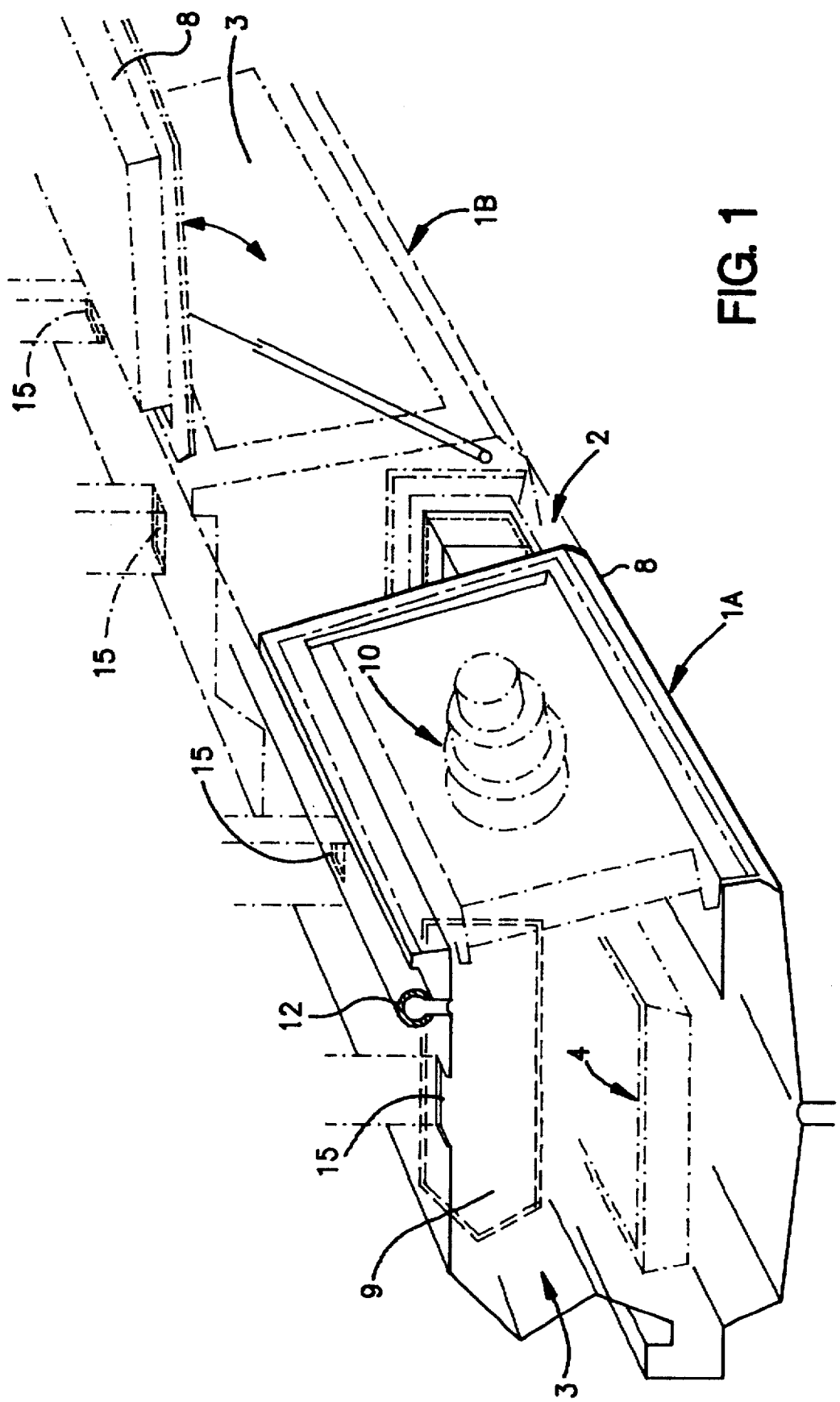
FIG. 1 is a cross sectional view and in perspective of a tunnel oven comprising between two segments a connection device according to the invention.

FIG. 1 shows schematically two segments 1A, 1B of a tunnel oven for cooking food. The two segments are connected to each other by means of a connection device 2 according to the invention.

Each segment 1A, 1B comprises one or several cooking sections 3 aligned with each other.

Figure 2:
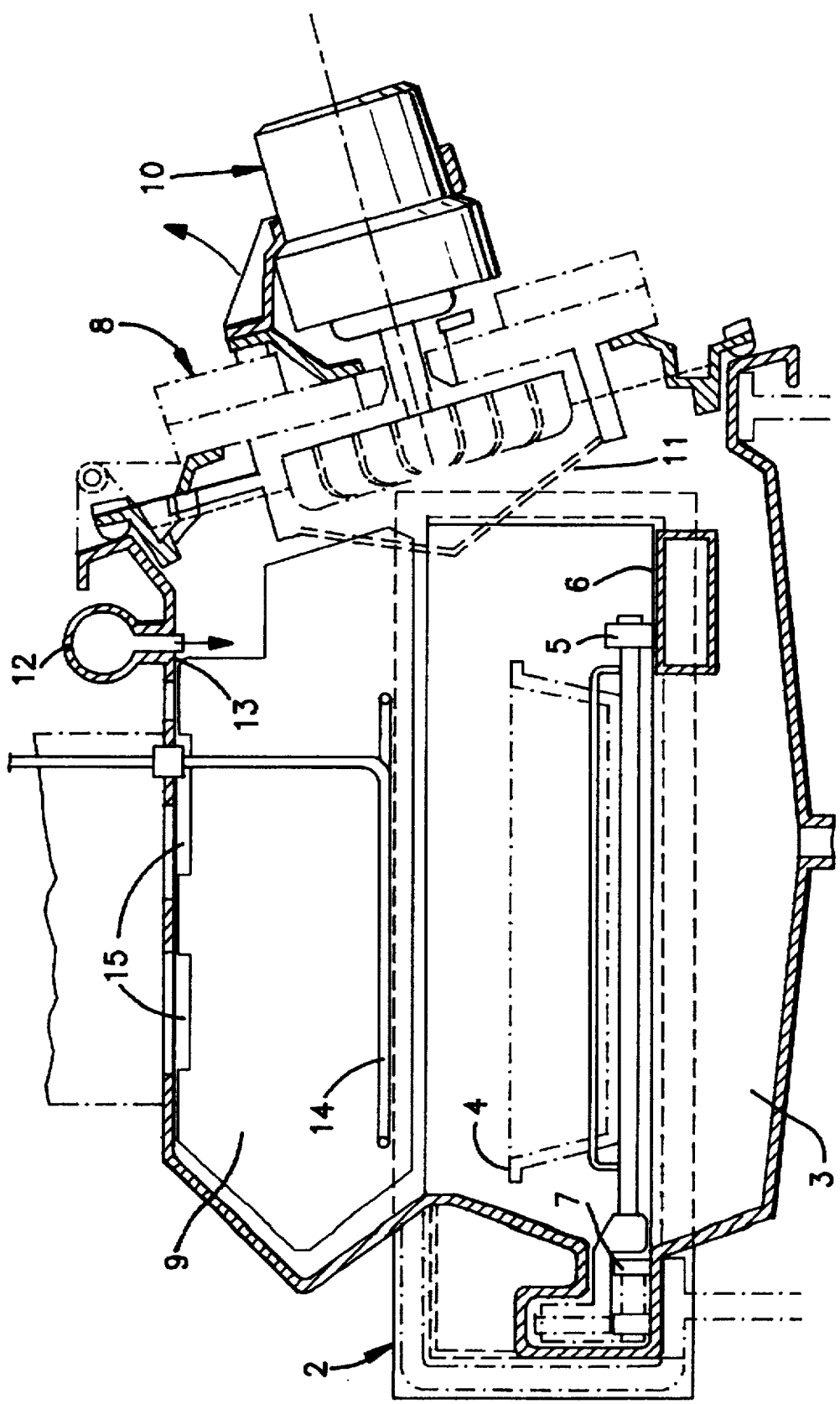
FIG. 2 is a cross sectional view of a tunnel oven provided with a device according to the invention.

The food to be cooked is in a conventional way contained in trays 4, these trays being disposed on carriage 5 moved along a roller path 6 of a conveyor 7 which passes through the tunnel (see FIG. 2).

The tunnel is provided with several access doors 8 opening inwardly of the latter, particularly for periodic cleaning.

Each cooking section in the illustrated example of FIGS. 1 and 2 is separated from the following section by a plate extending vertically from the ceiling of the tunnel and which forms a microwave deflector, such that each section constitutes in effect a chamber delimited in its upper portion.

Each cooking section or chamber 3 has several different heating means.

Thus, each cooking section or chamber 3 is provided with an assembly 10 for the production of an airflow, comprising a deflector grill 11 directed inwardly of the tunnel.

These assemblies 10 for the production of an airflow are preferably integrated in the access door 8 inwardly of the tunnel.

Each cooking segment 3 is in the illustrated example of FIGS. 1 and 2 provided with steam distribution means 12 within the chamber 3. These means comprise nozzles 12 opening into the chambers.

Each section 3 can moreover preferably be provided with elements for producing infrared radiation, comprised by shielded electric resistances 14 suspended at a suitable height in each chamber.

The tunnel oven is moreover preferably provided with means for cooking by microwaves. Microwaves permit above all obtaining a greater rapidity of cooking, the effect of this heating mode being immediate.

Microwave sources 15 are schematically indicated in FIGS. 1 and 2 and will not be described in greater detail because they are well known per se.

All the heating modes contribute to raising the temperature within the tunnel to a temperature of about 250° C. The temperature of the walls of the tunnel rises as a result, which inevitably gives rise to an expansion of the walls of the order of 1 mm/m/100° C.

Figure 3:
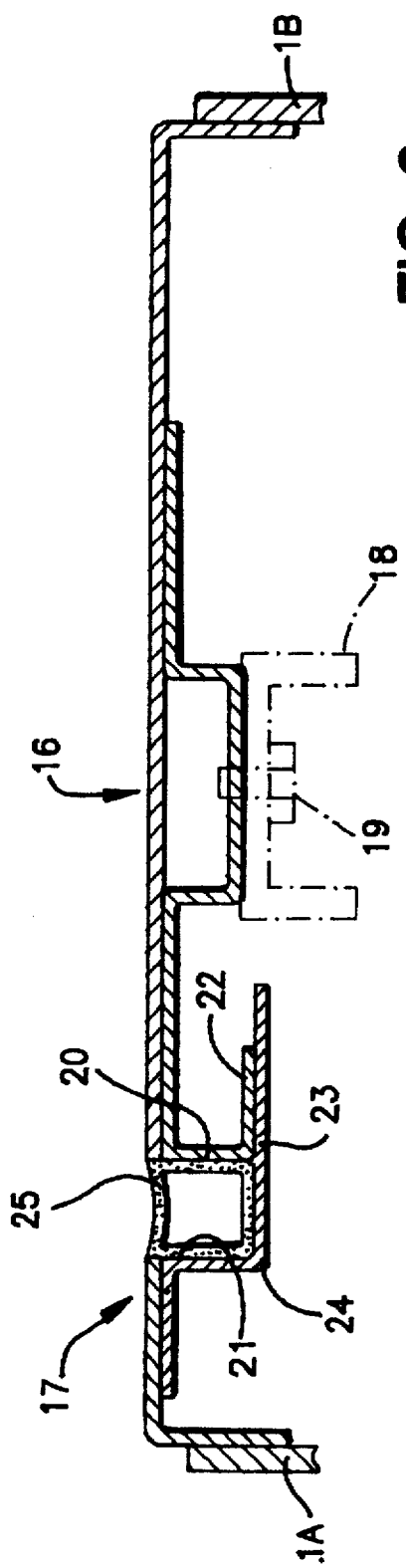
FIG. 3 is a cross sectional view of a device according to one embodiment of the invention.

To absorb this expansion, at least certain successive segments of the tunnel are interconnected by means of connection devices according to the invention. A first embodiment of such a connection device is shown in FIG. 3.

Each connection device comprises a first sleeve 16 and a second sleeve 17 of which the first is fixed to the frame (schematically indicated by reference numeral 18) of the tunnel by means of conventional securement means such as screws 19, and also to one (1B) of the successive segments 1A, 1B of the tunnel, whilst the second sleeve 17 is secured to the other segment 1A.

In the example illustrated in FIGS. 1 and 2, the sleeves 16, 17 are disposed in the lower portion of the tunnel. They have a shape suitable to permit the passage of the trays 4 which pass by on the conveyor 7. This shape is preferably rectangular as shown in the figures.

The sleeves 16, 17 can also have a circular shape or else a shape corresponding to a transverse cross section of the walls of the tunnel to constitute a continuation of these latter.

The first and second sleeves 16, 17 comprise respective shoulders 20, 21 disposed facing each other and directed along the thickness of the sleeves outwardly of the tunnel. These shoulders 20, 21 are followed by respective sleeve portions 22, 23 extending parallel to each other in the axial direction of the sleeves.

The sleeve portions 22, 23 are in the illustrated example mounted slidably on each other so as to constitute guide members for the second sleeve 17 relative to the first sleeve 16.

The sleeve portions 22, 23 have a sufficient length to permit the formation of a space 24 between the shoulders 20, 21 whilst ensuring guiding contact between the sleeve portions 22, 23.

Sealing means are provided, comprising a resilient sealing joint 25 disposed in the space 24 forming a recess opening inwardly of the tunnel and delimited on the one hand by facing shoulders 20, 21 and on the other hand by one (22) of the sleeve portions forming the bottom of this recess. The sealing joint is present about all the internal periphery of the device and it can for example be made of unreactive silicone.

Figure 5:
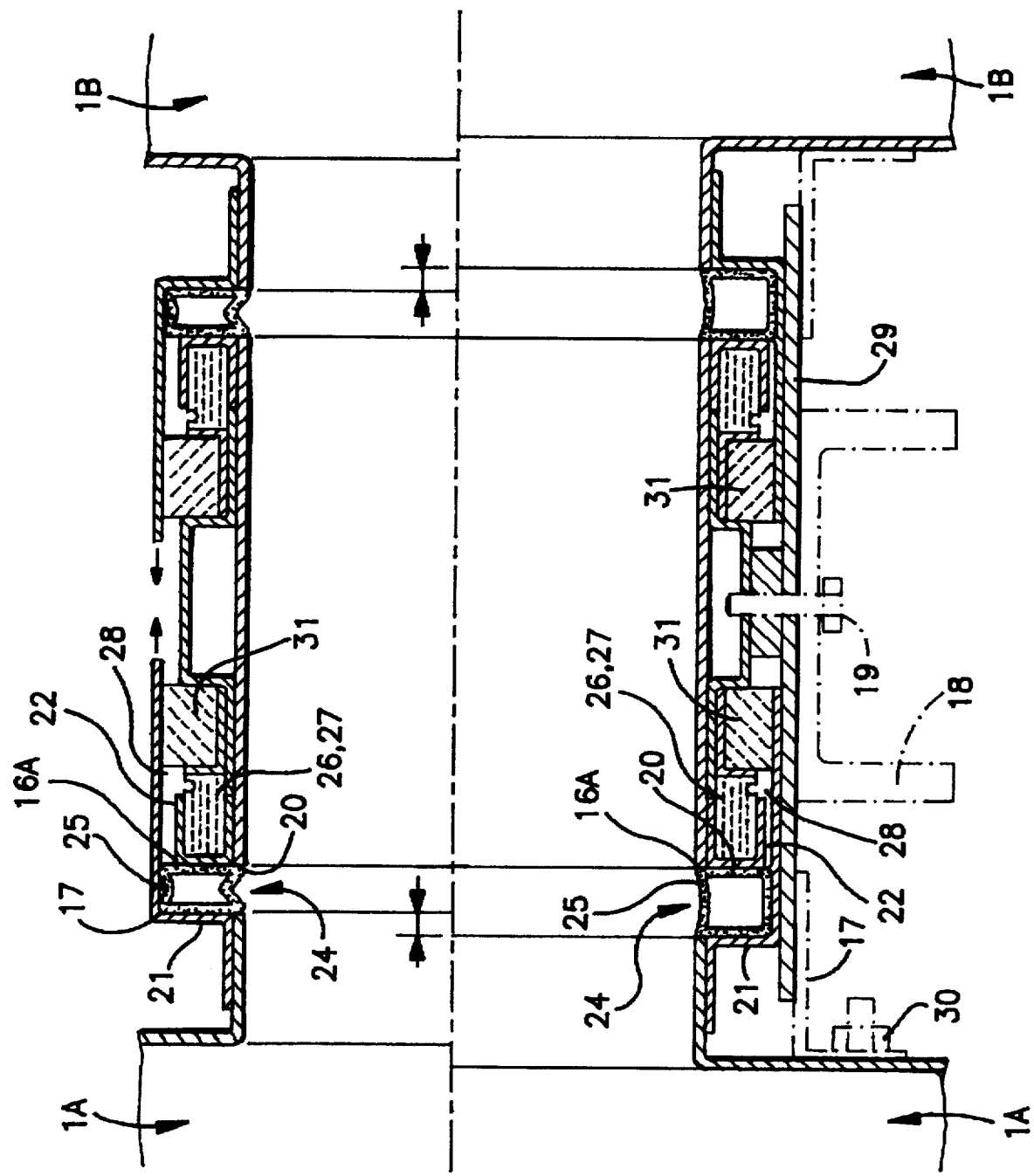
FIG. 5 shows in two half views a cross section of the details of a connection device according to another embodiment of the invention especially adapted to tunnel ovens using microwaves.

During expansion of the walls of the tunnel segments 1A, 1B brought on by temperature increase in the tunnel during its operation, the segment 1A connected to the second sleeve 17 pushes the latter back toward the first sleeve 17 whilst compressing the resilient sealing joint 25, as is shown at the upper portion of FIG. 5.

The sliding of the second sleeve 17 relative to the first sleeve 16 under the force of the expansion of the walls of the corresponding tunnel segment 1A is thus rendered possible without breaking the seal and the sliding contact between the sleeve portions 22, 23.

Figure 4:
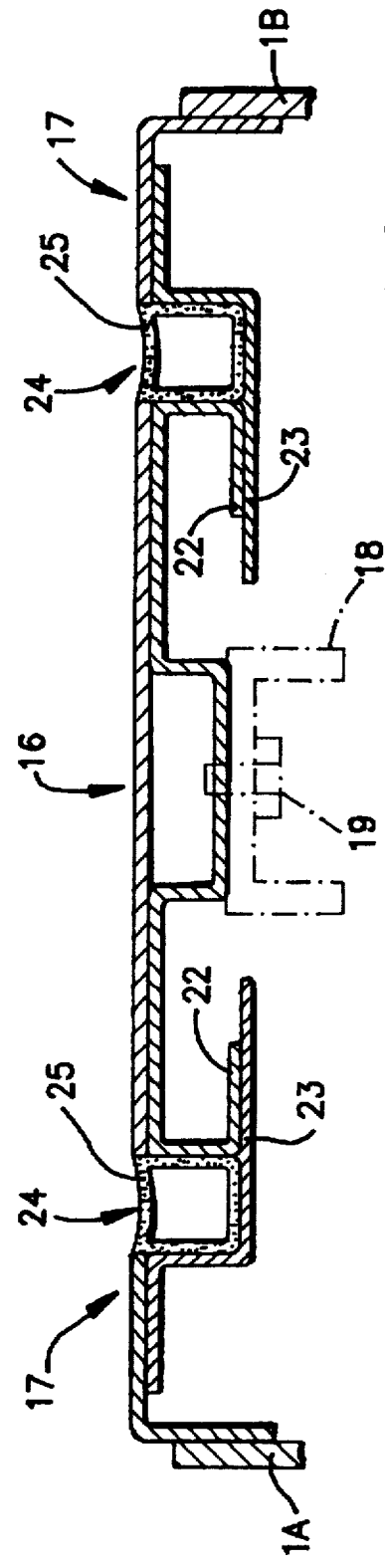
FIG. 4 is a cross sectional view of a modified form of FIG. 3.

FIG. 4 shows a preferred modification of this embodiment. In this modification, the two successive tunnel segments 1A, 1B are fixed to second slidable sleeves 17 disposed symmetrically on opposite sides of a first sleeve 17 fixed to the frame 18. This arrangement gives double the capacity to absorb expansion of the tunnel walls.

Finally, FIG. 5 shows an embodiment of connecting device especially adapted for tunnel ovens using microwave energy, these microwaves being applied by applicators 15 schematically shown in FIGS. 1 and 2.

In this embodiment, the connection device comprises moreover a quarter wave trap 26 designed according to the laws of electromagnetism, and comprising an unreactive silicone body 27 disposed within the thickness of a first fixed sleeve 16A.

The body 27, which in the example illustrated in FIG. 5 is disposed in a recess formed by a sleeve portion 22 of first sleeve 16, extends within the shoulder 20 and follows the contour of this latter so as to form a closed loop.

The sleeve portion 22 of the first sleeve 16A is not, in the embodiment illustrated, in sliding contact with the sleeve portion 23 of the second sleeve 17 so as to leave a passage 28 for microwaves toward the quarter wave trap 26.

The device comprises other means for guiding the second sleeve 17 relative to the first sleeve 16A. More precisely, there are plates 29 of which one is shown at the bottom of FIG. 5.

These plates 29 are regularly arranged about the periphery of the connection device and are interfingered between the frame 18 of the tunnel oven and the sleeve portion 23 of the corresponding sleeve 17. They are moreover connected to the first sleeve by securement means 19 for the sleeve to the chassis.

These plates 29 can if desired be provided with supplemental guide means in the form of L-shaped members 30 fixed to the second sleeves 17 and bearing against the external surfaces of plates 29.

There is thus obtained an electromagnetic continuity between the segments 1A, 1B extending through the connection device.

So as to improve further the protection against possible escape of microwaves, the connection device is preferably provided with a second body 31 similar to the first body 27 and also disposed within the thickness of the sleeves, behind the first body. This body 31 is of a material absorbing microwaves such as loaded silicone, and fills all the space across the thickness between the first and second sleeves 16A, 17.

There is thus obtained a reduction of microwave radiation to acceptable levels.

According to the invention, there is thus obtained a connection device which is simple and reliable, which has no risk of breaking because of expansion due to temperature differences within the tunnel.

What is claimed is:

1. A tunnel oven for cooking food comprising a device for interconnecting two successive segments (1A, 1B) of , the device comprising a first sleeve (16, 16A) secured to a chassis (18) of the tunnel oven and at least one second sleeve (17) fixed to a segment (1A, 1B) of the tunnel oven, the second sleeve (17) being mounted axially slidable relative to the first sleeve (16), and sealing means (25) for limiting release of cooking energy that is disposed between the first (16, 16A) and second (17) sleeves, within the thickness of said first and second sleeves, so as to permit sliding without loss of sealing between the sleeves (16, 16A; 17).

2. A tunnel oven according to claim 1, wherein said two successive segments (16, 16A, 17) are secured to a second respective sleeve (17), the two second sleeves being symmetrically disposed about a line halfway between said two successive segments on opposite sides of the first sleeve (16, 16A).

3. A tunnel oven according to claim 1, wherein said sealing means comprise a resilient sealing joint (25) disposed in a recess (24) which opens inwardly of the tunnel and is delimited by facing shoulders (20, 21) of the first and second sleeves (16, 16A, 17), as well as a sleeve portion forming a bottom of this recess (24).

4. A tunnel oven according to claim 3, wherein said shoulders (20, 21) are followed by respective sleeve portions (22, 23) extending parallel to each other in the axial direction of the first (16, 16A) and second (17) sleeves, these sleeve portions (22, 23) being mounted slidably on each other so as to constitute guide means for the second sleeve (17) for axial sliding movement relative to the first sleeve (16, 16A).

5. A tunnel oven according to claim 1 for tunnel ovens using microwave energy, wherein the device comprises a quarter wave trap (26) disposed within the thickness of the first sleeve (16A) adjacent the sealing means (25).

6. A tunnel oven according to claim 5, wherein the device further comprises a body (31) absorbent to microwaves, also disposed within the thickness of the first sleeve (16A), following the quarter wave trap (26), this absorbent body (31) filling all the space across the thickness between the first (16A) and second (17) sleeves.

7. A tunnel oven according to claim 6, wherein the sealing means (25), the quarter wave trap (26) and the body (31) absorbing microwaves comprise silicone.

8. A tunnel oven according to claim 5, further comprising guide means for the second sleeve (17) for axial sliding movement relative to the first sleeve, said guide means comprising plates (29) regularly spaced about the periphery of the device and interposed between the chassis (18) of the tunnel and a sleeve portion (23) of the second sleeve (17).

9. A tunnel oven according to claim 8, further comprising supplemental guide means in the form of L-shaped members (30) secured to the second sleeve (17) and bearing against external surfaces of the plates (29).

10. A tunnel oven according to claim 1, wherein the device has a rectangular shape and is disposed in a lower portion of the tunnel oven.

* * * * *